(12) United States Patent
Nakayama et al.

(10) Patent No.: US 9,031,524 B2
(45) Date of Patent: May 12, 2015

(54) COMPUTER-READABLE STORAGE MEDIUM HAVING STORED THEREIN INFORMATION PROCESSING PROGRAM, INFORMATION PROCESSOR, INFORMATION PROCESSING SYSTEM, AND INFORMATION PROCESSING METHOD

(75) Inventors: Satoshi Nakayama, Kyoto (JP); Yuki Mizuguchi, Kyoto (JP); Tooru Ooe, Kyoto (JP); Tetsuya Nakata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 160 days.

(21) Appl. No.: 13/404,550

(22) Filed: Feb. 24, 2012

(65) Prior Publication Data
US 2012/0220251 A1   Aug. 30, 2012

(30) Foreign Application Priority Data
Feb. 25, 2011   (JP) .................. 2011-040937

(51) Int. Cl.
H04B 1/38   (2006.01)
(52) U.S. Cl.
CPC .................... *H04B 17/318* (2015.01)
(58) Field of Classification Search
CPC ...... H04W 24/00; H04W 28/04; H04L 41/12; H04L 29/06; A63F 13/12
USPC ........... 455/67.11; 370/254, 329, 401; 463/42
See application file for complete search history.

(56) References Cited

U.S. PATENT DOCUMENTS

| | | | |
|---|---|---|---|
| 6,745,011 B1 * | 6/2004 | Hendrickson et al. | 455/67.11 |
| 6,754,470 B2 * | 6/2004 | Hendrickson et al. | 455/67.11 |
| 7,113,498 B2 * | 9/2006 | Bajic | 370/338 |
| 7,349,360 B2 * | 3/2008 | Gutierrez et al. | 370/315 |
| 7,539,517 B2 * | 5/2009 | Estrada et al. | 455/562.1 |
| 7,643,460 B2 * | 1/2010 | Bajic | 370/338 |
| 7,653,346 B2 * | 1/2010 | Nishihara et al. | 455/7 |
| 7,664,465 B2 * | 2/2010 | Shen et al. | 455/63.1 |
| 7,792,076 B2 * | 9/2010 | Lee et al. | 370/329 |
| 7,821,997 B2 * | 10/2010 | Talmola et al. | 370/332 |
| 7,844,266 B2 * | 11/2010 | Jeyaseelan et al. | 455/432.1 |
| 7,953,372 B2 * | 5/2011 | Ofek et al. | 455/63.4 |
| 8,045,518 B2 * | 10/2011 | Kuo | 370/329 |
| 8,199,633 B2 * | 6/2012 | Yagi | 370/208 |
| 8,275,377 B2 * | 9/2012 | Nanda et al. | 455/436 |
| 8,279,882 B2 * | 10/2012 | Matsunada | 370/401 |
| 8,433,337 B2 * | 4/2013 | Chin | 455/456.1 |
| 8,460,112 B2 * | 6/2013 | Masuda et al. | 463/42 |
| 8,830,918 B2 * | 9/2014 | Pelletier et al. | 370/329 |
| 8,934,468 B2 * | 1/2015 | Maekawa | 370/345 |

(Continued)

FOREIGN PATENT DOCUMENTS

| | | |
|---|---|---|
| JP | 2001-320744 | 11/2001 |
| JP | 2004-248067 | 9/2004 |

(Continued)

*Primary Examiner* — Hai V Nguyen
(74) *Attorney, Agent, or Firm* — Nixon & Vanderhye, P.C.

(57) ABSTRACT

A game apparatus receives signals from a plurality of game apparatuses. When the game apparatus has received signals from the plurality of game apparatuses, the game apparatus sorts the signals by apparatus and calculates an average RSSI value of the signals for each of the respective apparatuses. The game apparatus further calculates an average value of the calculated average RSSI values of the respective apparatuses. Then, the game apparatus determines a single icon to be displayed based on the calculated average value and causes the icon to be displayed on a screen.

27 Claims, 8 Drawing Sheets

(56) References Cited

U.S. PATENT DOCUMENTS

| | | | |
|---|---|---|---|
| 2002/0155818 A1* | 10/2002 | Boros et al. | 455/67.4 |
| 2004/0204193 A1* | 10/2004 | Li et al. | 455/575.1 |
| 2005/0123083 A1* | 6/2005 | Kawakami | 375/347 |
| 2006/0083443 A1* | 4/2006 | Tojo | 382/305 |
| 2006/0209762 A1* | 9/2006 | Talmola et al. | 370/332 |
| 2006/0291439 A1* | 12/2006 | Yang et al. | 370/338 |
| 2007/0037523 A1* | 2/2007 | Bi et al. | 455/69 |
| 2007/0127503 A1* | 6/2007 | Zhao | 370/400 |
| 2008/0175203 A1* | 7/2008 | Jen | 370/331 |
| 2008/0242220 A1* | 10/2008 | Wilson et al. | 455/3.04 |
| 2009/0189809 A1* | 7/2009 | Baba | 342/357.12 |
| 2009/0285169 A1* | 11/2009 | Yang et al. | 370/329 |
| 2009/0296649 A1* | 12/2009 | Yagi | 370/330 |
| 2010/0304738 A1* | 12/2010 | Lim | 455/426.1 |
| 2011/0176455 A1* | 7/2011 | Matsunada | 370/254 |
| 2012/0113942 A1* | 5/2012 | Kim | 370/329 |

FOREIGN PATENT DOCUMENTS

| | | |
|---|---|---|
| JP | 2005-277683 | 10/2005 |
| JP | 2006-295261 | 10/2006 |
| JP | 2007-104365 | 4/2007 |

* cited by examiner

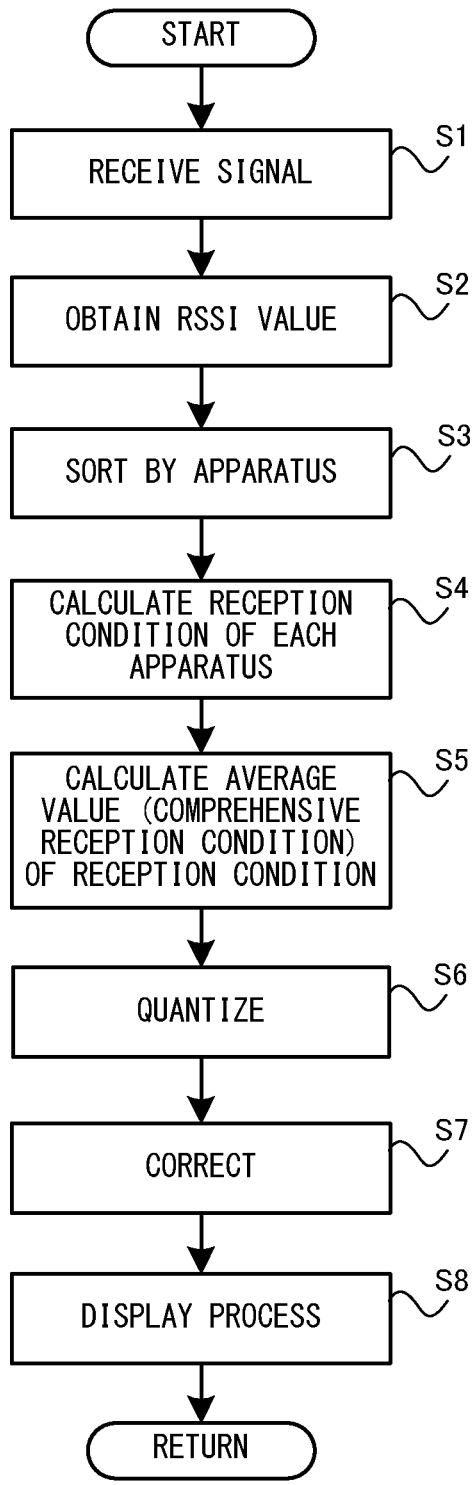
F I G. 8

F I G. 9
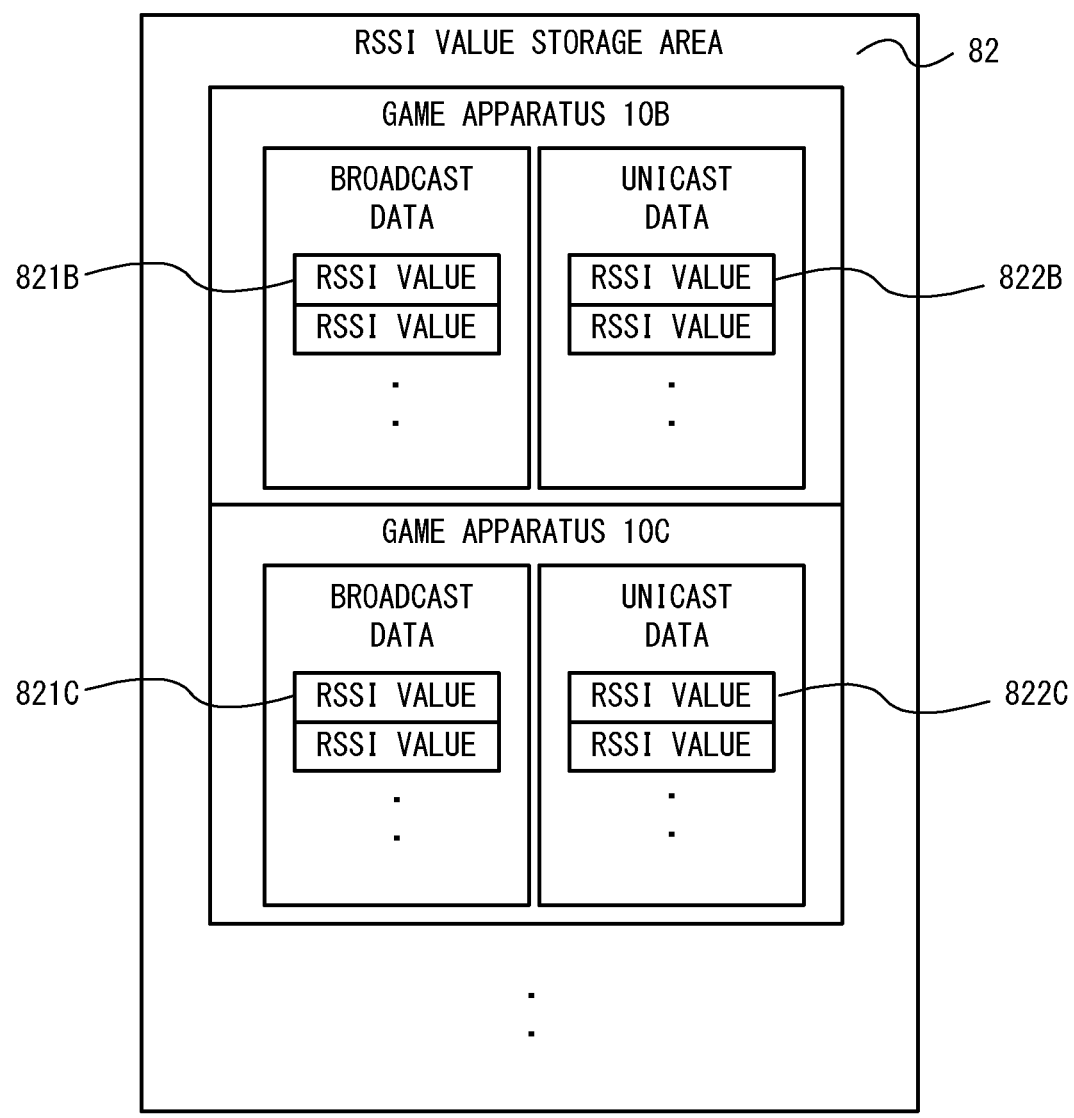

COMPUTER-READABLE STORAGE MEDIUM HAVING STORED THEREIN INFORMATION PROCESSING PROGRAM, INFORMATION PROCESSOR, INFORMATION PROCESSING SYSTEM, AND INFORMATION PROCESSING METHOD

CROSS REFERENCE TO RELATED APPLICATION

The disclosure of Japanese Patent Application No. 2011-040937, filed on Feb. 25, 2011, is incorporated herein by reference.

FIELD

The technology disclosed herein relates to information processors having a wireless communication function, information processing programs executed on the information processors, information processing systems, and information processing methods.

BACKGROUND AND SUMMARY

Conventionally, there has been an apparatus which displays the reception condition of radio waves from another apparatus which is wirelessly communicable with the apparatus. For example, there is a conventional apparatus that receives radio waves from an access point of wireless LAN, calculates the strength of the radio waves, and displays the reception condition based on the calculated strength of the radio waves.

However, the above conventional apparatus is not assumed to communicate with a plurality of apparatuses and is not configured to collectively display the reception conditions of the plurality of apparatuses.

Therefore, an object of the exemplary embodiment is to provide an information processing technique that allows calculation of the reception condition of signals from a plurality of apparatuses.

In order to achieve the above object, the exemplary embodiment has the following features.

The exemplary embodiment is an information processing program executed on a computer of an information processor having a wireless communication function. The information processing program causes the computer to execute: calculating a reception condition of a signal transmitted from each of a plurality of apparatuses having a wireless communication function; and calculating a comprehensive reception condition representing the respective reception conditions of the signals from the plurality of apparatuses comprehensively by using the respective reception conditions having been calculated.

According to the above, the reception condition of each of the apparatuses can be calculated and a comprehensive reception condition that comprehensively represents the reception conditions calculated for the respective apparatuses can be calculated. Accordingly, for example, by displaying an image representing the comprehensive reception condition on a display screen, a user can know the reception condition of signals from the plurality of apparatuses by a single image.

In another configuration, values that respectively represent the calculated reception conditions may be averaged, and thereby the comprehensive reception condition may be calculated.

According to the above, an average of the reception conditions of the respective apparatuses can be calculated. Accordingly, an average reception condition of the plurality of apparatuses can be calculated.

In another configuration, the information processing program may further cause the computer to execute correcting the calculated comprehensive reception condition based on the respective reception conditions having been calculated.

According to the above, the calculated comprehensive reception condition can be corrected.

In another configuration, the computer may be further caused to execute determining whether each of the values that represent the calculated respective reception conditions is smaller than or equal to a predetermined reference value. The comprehensive reception condition is corrected in accordance with a result of the determination.

According to the above, whether each reception condition is smaller than or equal to a reference value is determined and a result of the determination can be reflected in the comprehensive reception condition.

In another configuration, the comprehensive reception condition may be corrected when there is any apparatus, among the plurality of apparatuses, with respect to which a result of the determination is affirmative.

According to the above, the comprehensive reception condition can be corrected when there is any apparatus with respect to which a value representing a reception condition is smaller than or equal to a reference value.

In another configuration, the computer may be further caused to execute measuring a time from reception of a signal from an apparatus to next reception of a signal from the apparatus. When the measured time is longer than or equal to a predetermined time period, the comprehensive reception condition is calculated, excluding the apparatus with respect to which the predetermined time period has elapsed.

According to the above, the comprehensive reception condition can be calculated excluding an apparatus with respect to which a predetermined time period has elapsed from a time of reception of a signal. Accordingly, the comprehensive reception condition can be calculated by using, for example, only apparatuses that are currently in communication.

In another configuration, the comprehensive reception condition may be calculated by using the lowest one of the values that represent the respective reception conditions.

According to the above, the comprehensive reception condition can be calculated based on an apparatus in the poorest reception condition.

In another configuration, the comprehensive reception condition may be calculated based on a ratio of apparatuses with respect to which the values that represent the respective reception conditions are greater than or equal to a predetermined reference value.

According to the above, the comprehensive reception condition can be calculated based on a ratio of apparatus with respect to which values representing reception conditions are greater than or equal to a predetermined reference value.

In another configuration, any of the respective reception conditions is selected time-sequentially, and the comprehensive reception condition may be calculated by using the selected reception condition.

According to the above, any of the respective reception conditions having been calculated is selected time-sequentially, and the comprehensive reception condition can be calculated by using the selected reception condition.

In another configuration, each of the calculated respective reception conditions is assigned weighting and the weighted reception conditions are averaged, and thereby the comprehensive reception condition may be calculated.

According to the above, the reception conditions are respectively weighted and the weighted reception conditions can be averaged.

In another configuration, the reception conditions are assigned weighting so that greater weighting is assigned to the reception condition of a specific apparatus among the plurality of apparatuses than those of the others of the plurality of apparatuses, and the values representing the weighted respective reception conditions are averaged, and thereby the comprehensive reception condition may be calculated.

According to the above, the comprehensive reception condition can be calculated by, for example, assigning greater weighting to an apparatus with a higher degree of importance.

In another configuration, the reception conditions of signals transmitted from the plurality of apparatuses are sorted by apparatus and by signal type, and the reception condition for each sorted group may be calculated.

According to the above, each reception condition sorted not only by apparatus but also by signal type can be calculated. For example, reception conditions may be sorted based on whether each of received signals is broadcast data or unicast data.

In another configuration, weighting is assigned in accordance with the signal type and the weighted values representing the respective reception conditions are averaged, and thereby the comprehensive reception condition may be calculated.

According to the above, weighting can be assigned in accordance with a signal type and an average of the reception conditions can be calculated.

In another configuration, the information processing program may further cause the computer to execute transmitting a predetermined signal to at least one of the plurality of apparatuses and receiving a response for the signal.

According to the above, a predetermined signal can be transmitted to the other apparatuses and a response for the signal can be received. Accordingly, for example, a signal can be mandatorily received from an apparatus from/to which data is not frequently received/transmitted.

In another configuration, the predetermined signal may be transmitted to an apparatus, among the plurality of apparatuses, from which no signal has been received for a predetermined time period so that a response for the predetermined signal is received from the apparatus.

According to the above, a response can be received from an apparatus from which no signal has been received for a predetermined time period, and thus the reception condition of the signal from the apparatus can be reflected in the comprehensive reception condition.

In another configuration, the information processing program may further cause the computer to execute notifying a user of information representing the comprehensive reception condition.

According to the above, the user can be informed of the comprehensive reception condition. For example, the user can be informed of the reception condition by displaying an image representing the comprehensive reception condition on a display screen.

Another embodiment may be implemented in the form of an information processor which realizes the above features. Further, another embodiment may be configured as an information processing system in which a plurality of elements which respectively realize the above features. The information processing system may be configured as a single device or may be configured as a plurality of devices. Another embodiment may be implemented in the form of an information processing method.

According to the exemplary embodiment, the reception condition of signals from a plurality of apparatuses can be calculated.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 8 is a non-limiting example of a flow chart illustrating a flow of a display process executed by a game apparatus 10A; and FIG. 9 is a diagram illustrating a non-limiting example of a memory map of the game apparatus 10 in another embodiment.

DETAILED DESCRIPTION OF NON-LIMITING EXAMPLE EMBODIMENTS (Structure of Game Apparatus)

Figure 1:
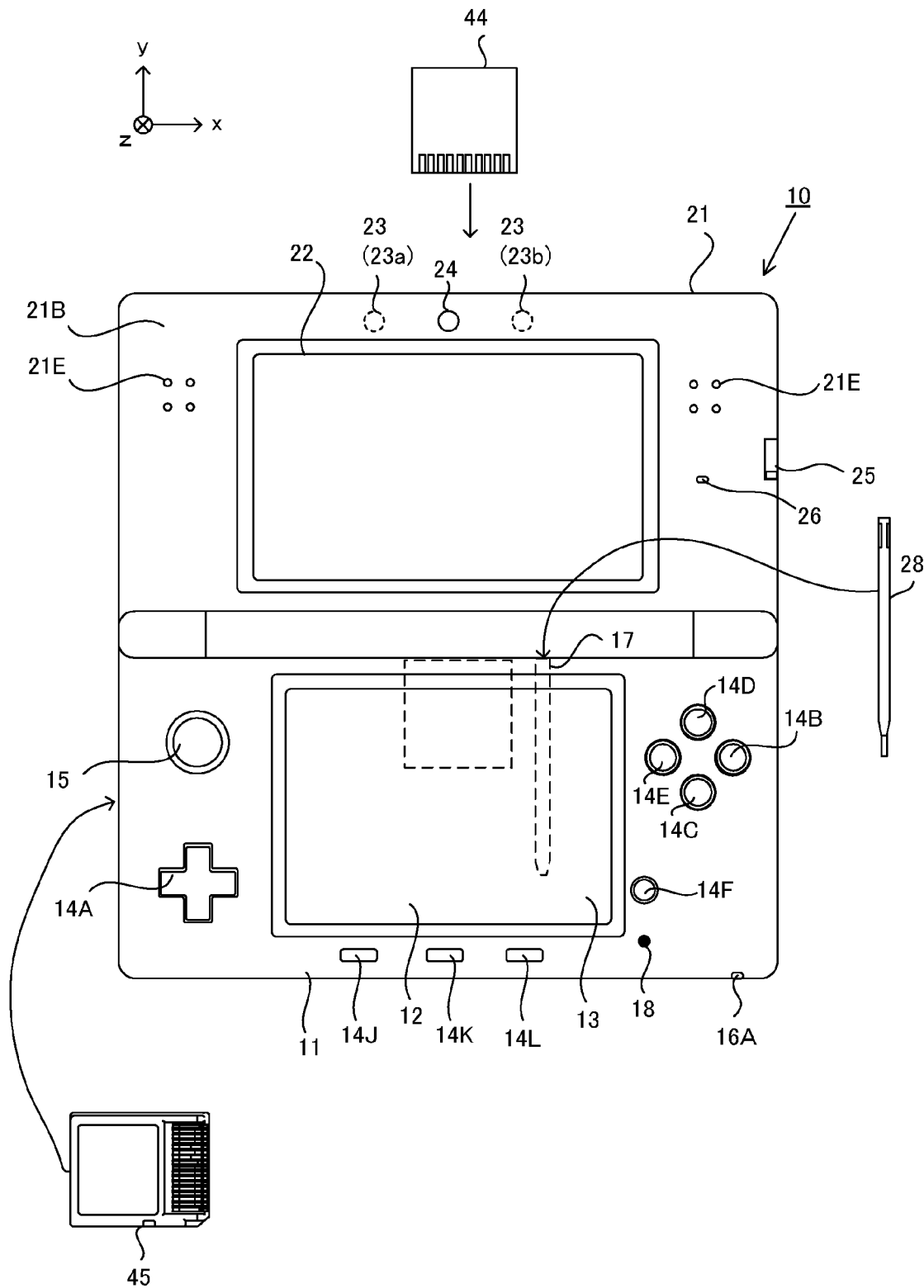
FIG. 1 is a front view of a non-limiting example of a game apparatus 10 in an opened state.
Figure 2:
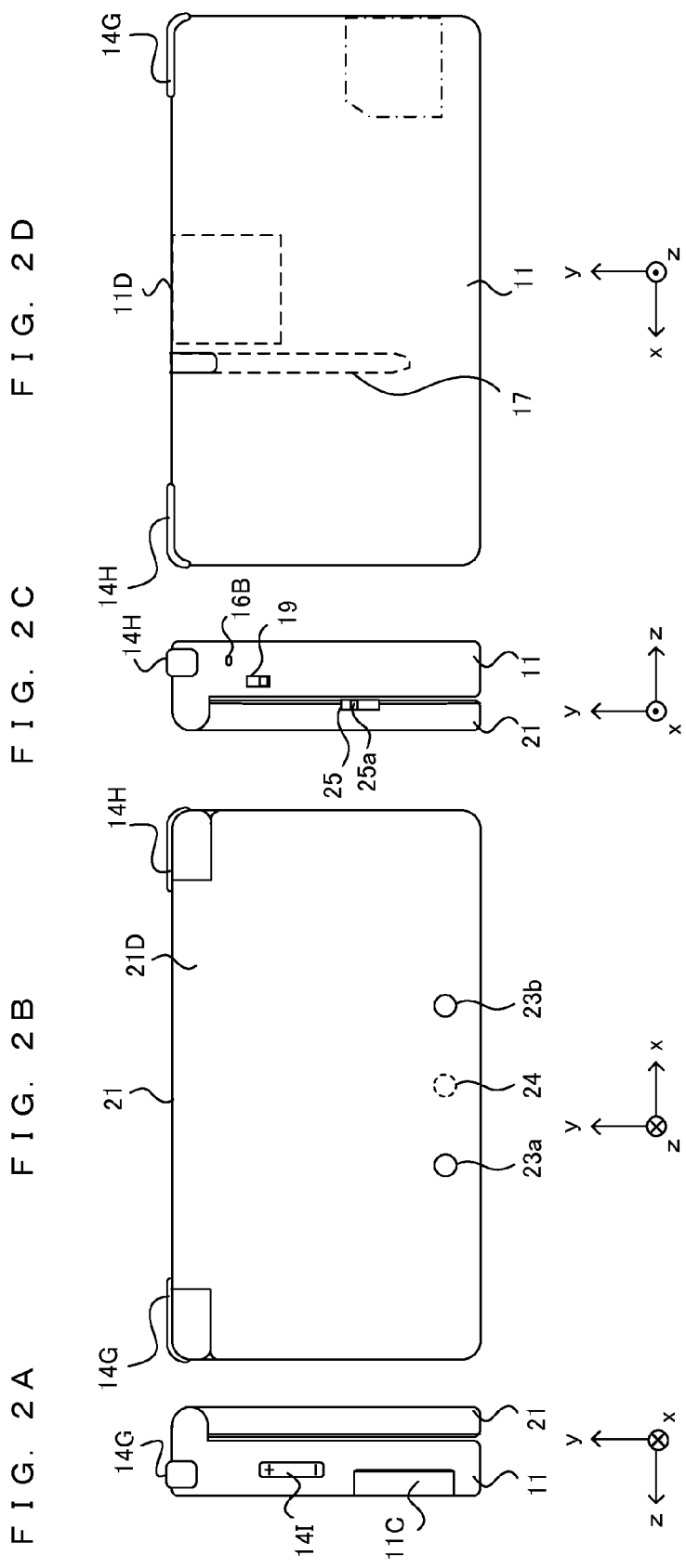
FIG. 2A is a left side view of the non-limiting game apparatus 10 in a closed state.
FIG. 2B is a front view of the non-limiting game apparatus 10 in the closed state.
FIG. 2C is a right side view of the non-limiting game apparatus 10 in the closed state.
FIG. 2D is a rear view of the non-limiting game apparatus 10 in the closed state.

Hereinafter, a game apparatus according to an exemplary embodiment will be described. FIG. 1 is a front view showing an external view of a game apparatus 10 in an opened state. FIG. 2A is a left side view of the game apparatus 10 in a closed state, FIG. 2B is a front view of the game apparatus 10 in the closed state, FIG. 2C is a right side view of the game apparatus 10 in the closed state, and FIG. 2D is a rear view of the game apparatus 10 in the closed state. The game apparatus 10 is a hand-held game apparatus, and is configured to be foldable as shown in FIG. 1 to FIG. 2. FIG. 1 shows the game apparatus 10 in the opened state and FIG. 2A to 2D each show the game apparatus 10 in the closed state. The game apparatus 10 is able to take an image by an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 2. The game apparatus 10 includes a lower housing 11 and an upper housing 21 as shown in FIG. 1 to FIG. 2. The lower housing 11 and the upper housing 21 are connected to each other so as to be openable and closable (foldable).

(Description of Lower Housing)

Initially, a structure of the lower housing 11 will be described. As shown in FIG. 1 to FIG. 2, a lower LCD (Liquid Crystal Display) 12, a touch panel 13, operation buttons 14A to 14L, an analog stick 15, an LED 16A and an LED 16B, an insertion opening 17, and a microphone hole 18 are provided in the lower housing 11. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 described below. Although an LCD is used as a display device in the exemplary embodiment, any other display device such as a display device using an EL (Electro Luminescence) or the like, may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the exemplary embodiment, the touch panel 13 is, but is not limited to, a resistive film type touch panel. A touch panel of any type such as electrostatic capacitance type may be used. In the exemplary embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 2D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A has a cross shape, and includes buttons for indicating an upward, a downward, a leftward, or a rightward direction. The buttons 14A to 14E, the selection button 14J, the HOME button 14K, and the start button 14L are assigned functions, respectively, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which is configured to slide parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

As shown in FIG. 2B and FIG. 2D, an L button 14G and an R button 14H are provided on the upper side surface of the lower housing 11. The L button 14G and the R button 14H act as shutter buttons (imaging instruction buttons) of the imaging section, for example. Further, as shown in FIG. 2A, a sound volume button 14I is provided on the left side surface of the lower housing 11. The sound volume button 14I is used for adjusting a sound volume of a speaker of the game apparatus 10.

As shown in FIG. 2A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2D, an insertion opening 11D, through which an external memory 44 having a game program stored therein is inserted, is provided on the upper side surface of the lower housing 11, and a connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIG. 1 and FIG. 2C, the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the function of the wireless communication is enabled. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 2C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, these components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the exemplary embodiment, the upper LCD 22 is an LCD, a display device using, for example, an EL (Electro Luminescence), or the like may be used. In addition, a display device having any resolution may be used as the upper LCD 22.

The upper LCD 22 is a display device capable of displaying a stereoscopically visible image. Further, in the exemplary embodiment, a left-eye image and a right-eye image are displayed by using substantially the same display area. Specifically, the upper LCD 22 is a display device using a method in which the left-eye image and the right-eye image are alternately displayed in the horizontal direction in predetermined units (for example, every other line). Alternatively, the upper LCD 22 may be a display device using a method in which the left-eye image and the right-eye image are alternately displayed for a predetermined time period and the left-eye image and the right-eye image are viewed by the user's left eye and the right eye, respectively, by using glasses. In the exemplary embodiment, the upper LCD 22 is a display device capable of displaying an image which is stereoscopically visible by the naked eye, and a lenticular lens type display device or a parallax barrier type display device is used which enables the left-eye image and the right eye image, which are alternately displayed in the horizontal direction, to be separately viewed by the left eye and right eye, respectively. In the exemplary embodiment, the upper LCD 22 of a parallax barrier type is used. The upper LCD 22 displays, by using the right-eye image and the left eye image, an image (a stereoscopic image) which is stereoscopically visible by the naked eye. That is, the upper LCD 22 allows a user to view the left-eye image with her/his left eye, and the right-eye image with her/his right eye by utilizing a parallax barrier, so that a stereoscopic image (a stereoscopically visible image) exerting a stereoscopic effect on a user can be displayed. Further, the upper LCD 22 may disable the parallax barrier. When the parallax barrier is disabled, an image can be displayed in a planar manner (it is possible to display a planar visible image which is different from a stereoscopically visible image as described above. That is, a display mode is used in which the same displayed image is viewed with the left eye and the right eye). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of shift of the right-eye image and the left-eye image in the horizontal direction is adjusted in accordance with the position of the slider 25a.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode.

Further, a speaker hole 21E is provided on the inner side surface of the upper housing 21. A sound from a speaker 43 described below is outputted through the speaker hole 21E.

(Internal Configuration of Game Apparatus 10)

Figure 3:
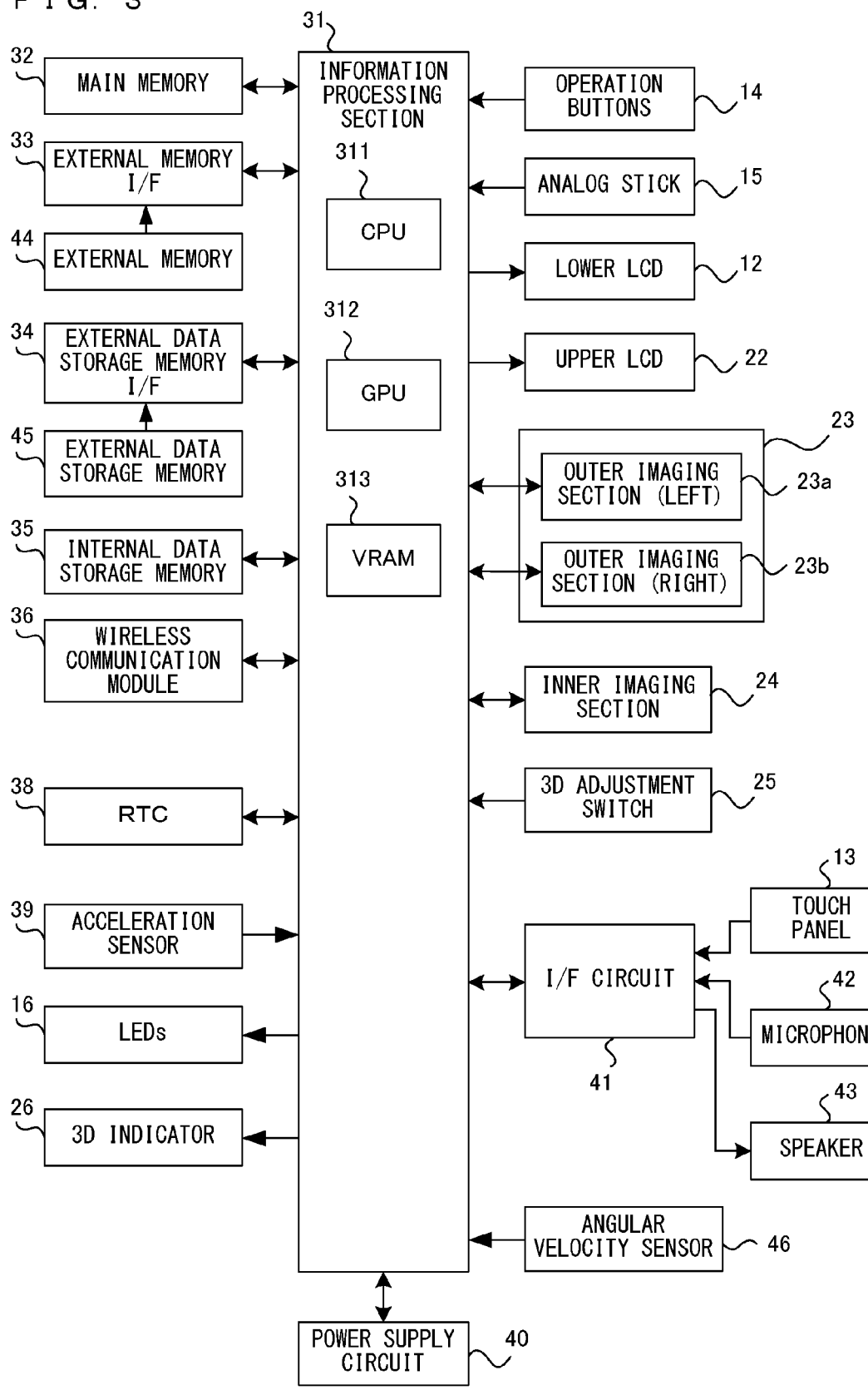
FIG. 3 is a block diagram illustrating a non-limiting example of an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a real-time clock (RTC) 38, an acceleration sensor 39, a power supply circuit 40, an interface circuit (I/F circuit) 41. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a process according to the program by executing a program stored in a memory (for example, the external memory 44 connected to the external memory I/F 33 or the internal data storage memory 35) inside the game apparatus 10. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the exemplary embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through wireless communication via the wireless communication module 36 are stored in the internal data storage memory 35.

The wireless communication module 36 has a function of connecting to a wireless LAN by using a method based on, for example, IEEE 802.11.b/g standard. The wireless communication module 36 is connected to the information processing section 31. The information processing section 31 can perform data transmission to and data reception from another device via the Internet by using the wireless communication module 36.

The acceleration sensor 39 is connected to the information processing section 31. The acceleration sensor 39 detects magnitudes of accelerations (linear accelerations) in directions of straight lines along three axial (xyz axial) directions, respectively. The acceleration sensor 39 is provided inside the lower housing 11. In the acceleration sensor 39, as shown in FIG. 1, the long side direction of the lower housing 11 is defined as the x axial direction, the short side direction of the lower housing 11 is defined as the y axial direction, and the direction orthogonal to the inner side surface (main surface) of the lower housing 11 is defined as the z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of acceleration for one axial direction or two axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time and outputs the time to the information processing section 31. The information processing section 31 calculates a current time (date), based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier (not shown). The microphone 42 detects user's voice, and outputs a sound signal to the I/F circuit 41. The amplifier amplifies the sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data, based on a signal outputted from the touch panel 13, and outputs the touch position data to the information processing section 31. The touch position data represents a coordinate of a position on which an input is made on an input surface of the touch panel 13. The touch panel control circuit reads a signal outputted from the touch panel 13, and generates the touch position data every predetermined time. The information processing section 31 acquires the touch position data to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the exemplary embodiment, the information processing section 31 displays a stereoscopic image (stereoscopically visible image) on the upper LCD 22.

Specifically, the information processing section 31 is connected to an LCD controller (not shown) of the upper LCD 22, and causes the LCD controller to set the parallax barrier to ON or OFF. When the parallax barrier is set to ON in the upper LCD 22, a right-eye image and a left-eye image, which are stored in the VRAM 313 of the information processing section 31, are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the right-eye images and the left-eye images each of which is a rectangle-shaped image having one line of pixels aligned in the vertical direction, and an image, in which the rectangle-shaped image for the left eye which is obtained through the division, and the rectangle-shaped right-eye image which is obtained through the division are alternately aligned, is displayed on the screen of the upper LCD 22. A user views the images through the parallax barrier in the upper LCD 22, so that the right-eye image is viewed with the user's right eye, and the left-eye image is viewed with the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits to the information processing section 31 an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Further, the angular velocity sensor 46 is connected to the information processing section 31. The angular velocity sensor 46 detects an angular velocity about each axis (x axis, y axis, and z axis). The game apparatus 10 can calculate an orientation of the game apparatus 10 in real space, in accordance with an angular velocity sequentially detected by the angular velocity sensor 46. Specifically, the game apparatus 10 can calculate an angle of rotation of the game apparatus 10 about each axis by integrating, with time, the angular velocity about each axis, which is detected by the angular velocity sensor 46. This is the end of the description of the internal configuration of the game apparatus 10.

(Outline of Display Process)

Next, an outline of a display process according to an exemplary embodiment will be described with reference to the drawings. The game apparatus 10 is communicable with another game apparatus, via the wireless communication module 36, by using a method based on, for example, IEEE 802.11.b/g standard. A plurality of the game apparatuses 10 according to the exemplary embodiment are wirelessly connected with each other and communicate with each other.

Figure 4:
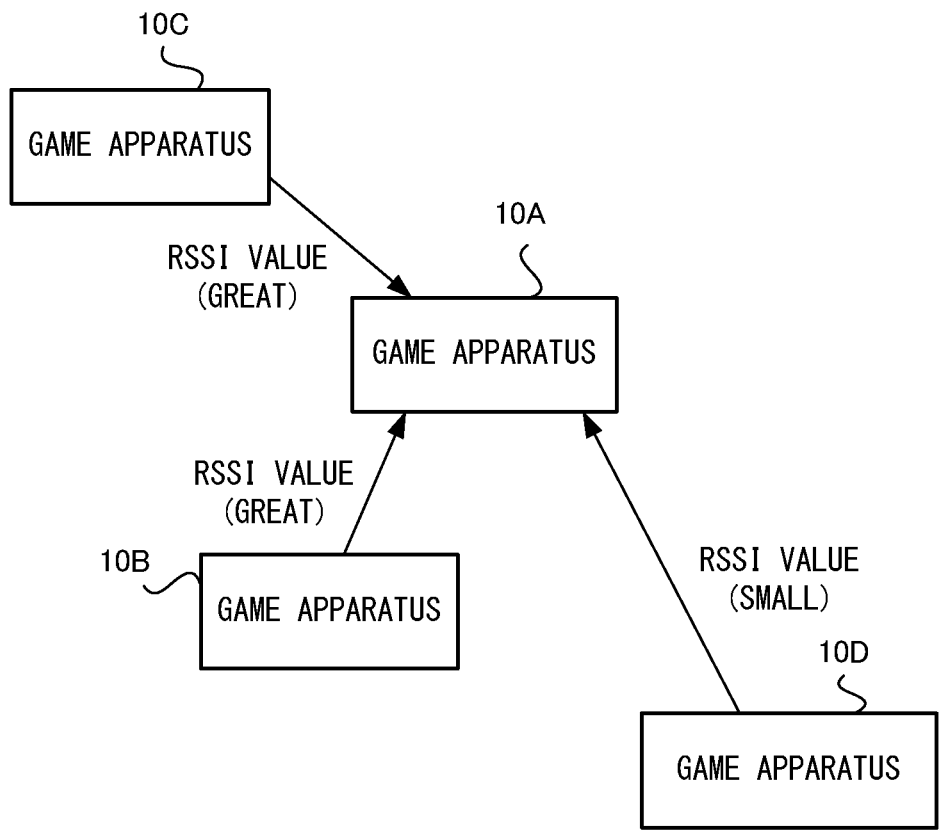
FIG. 4 is a diagram illustrating a non-limiting example of a network comprising a plurality of game apparatuses 10 according to the exemplary embodiment.

FIG. 4 is a diagram illustrating a network comprising a plurality of the game apparatuses 10 according to the exemplary embodiment. As shown in FIG. 4, a game apparatus 10A is connected with each of a game apparatus 10B, a game apparatus 10C, and a game apparatus 10D. The game apparatus 10A receives/transmits data from/to the respective game apparatuses 10B to 10D. For example, the game apparatus 10A serves as a master while the other game apparatuses 10B to 10D serve as clients. A client transmits data to another client via the master and the master distributes predetermined data to each client.

Here, the strength of a signal received (RSSI; Received Signal Strength Indication) by the game apparatus 10A varies depending on a positional relationship between the game apparatus 10A and each of the game apparatuses 10B to 10D and an object that exists between the apparatus 10A and each of the game apparatuses 10B to 10D.

Specifically, for example, when a distance between the game apparatus 10A and the game apparatus 10B is relatively short, an RSSI value of a signal from the game apparatus 10B becomes great. When a distance between the game apparatus 10A and the game apparatus 10C is relatively short, an RSSI value of a signal from the game apparatus 10C becomes great. Meanwhile, when a distance between the game apparatus 10A and the game apparatus 10D is relatively long, an RSSI value of a signal from the game apparatus 10D becomes small. In this situation, the game apparatus 10 according to the exemplary embodiment integrates reception conditions (reception conditions of radio waves) of the signals from the respective apparatuses and displays the integrated reception conditions as a single reception condition (comprehensive reception condition) on a screen.

Figure 5:
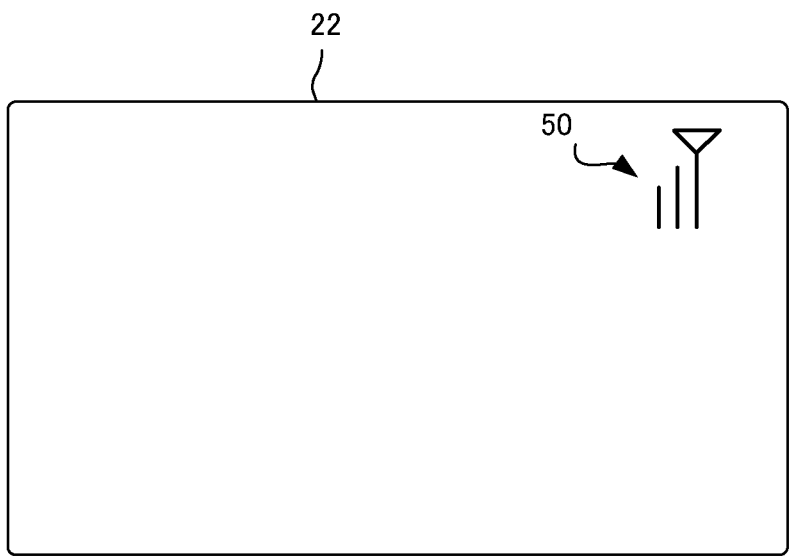
FIG. 5 is a diagram illustrating a non-limiting example of an icon 50 representing a comprehensive reception condition displayed on an upper LCD 22 of the game apparatus 10 according to the exemplary embodiment.

FIG. 5 is a diagram illustrating an icon 50 representing a comprehensive reception condition displayed on the upper LCD 22 of the game apparatus 10 according to the exemplary embodiment. As shown in FIG. 5, on the upper LCD 22 of the game apparatus 10A, for example, an icon 50 representing a comprehensive reception condition of the game apparatus 10A is displayed. The icon 50 is, for example, an image representing a plurality of antennas. The greater the number (1 to 4) of antennas shown by the icon 50 is, the better the comprehensive reception condition of the game apparatus 10A indicated becomes.

For example, when RSSI values of signals from all of the apparatuses are high, the number of antennas of the icon 50 is four. That is, when all of an RSSI value of a signal from the game apparatus 10B, an RSSI value of a signal from the game apparatus 10C, and an RSSI value of a signal from the game apparatus 10D, which have been received by the game apparatus 10A are great, the number of antennas of the icon 50 is four. Further, for example, when the RSSI value of the signal from the game apparatus 10B and the RSSI value of the signal from the game apparatus 10C are great while the RSSI value of the signal from the game apparatus 10D is small, the number of antenna of the icon 50 is three.

Figure 6:
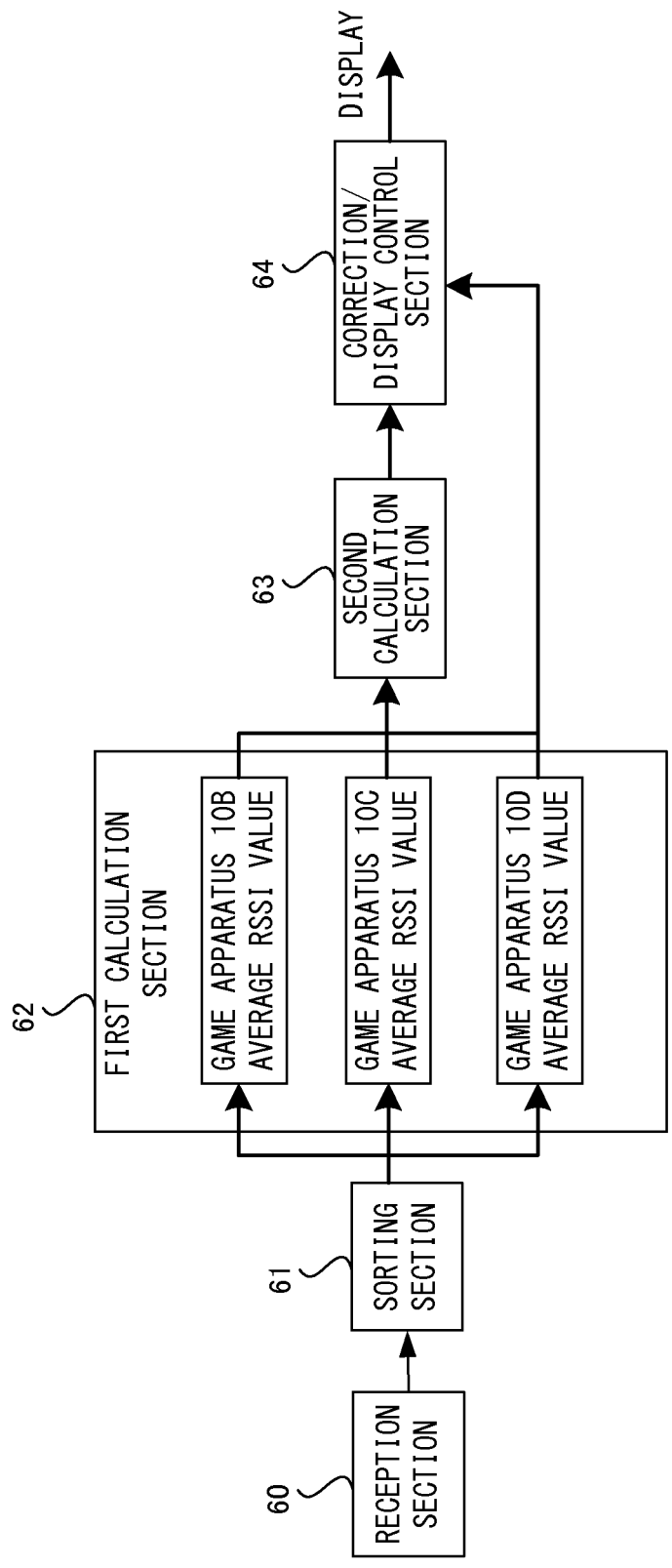
FIG. 6 is a non-limiting example of a functional block diagram of the game apparatus 10 according to the exemplary embodiment.

FIG. 6 is a functional block diagram of the game apparatus 10 according to the exemplary embodiment. As shown in FIG. 6, the game apparatus 10 includes a reception section 60, a sorting section 61, a first calculation section 62, a second calculation section 63, and a correction/display control section 64.

The reception section 60 receives signals from other apparatuses. The sorting section 61 sorts the received signals by apparatus. The first calculation section 62 calculates the received signal strength (RSSI values) of the signals sorted by apparatus by the sorting section 61.

Specifically, the first calculation section 62 calculates an average RSSI value based on the signals sorted by the sorting section 61. The strength of signals from each apparatus varies depending on the peripheral environment, noise, and the like, and thus the first calculation section 62 calculates an average RSSI value of signals received from each apparatus in a predetermined time period. The average RSSI value calculated as above represents the reception condition of signals from each corresponding apparatus.

By using the average RSSI values of the respective apparatuses calculated by the first calculation section 62, the second calculation section 63 calculates a value obtained by consolidating these RSSI values. Specifically, the second calculation section 63 calculates a total of the average RSSI values calculated by the first calculation section 62 and divides the total by the number of apparatuses, thereby calculating an average value of the average RSSI values of the respective apparatuses. The average value calculated as above indicates the reception condition (comprehensive reception condition) which comprehensively represents the reception conditions of the respective apparatuses.

The correction/display control section 64 determines a value (e.g. an integer value of 1 to 4) that represents the number of antennas of the icon 50 based on the average value calculated by the second calculation section 63 and corrects the value representing the number of antennas. For example, the correction/display control section 64 determines whether each of the average RSSI values calculated by the first calculation section 62 is smaller than or equal to a predetermined value. When there is an apparatus with respect to which a result of the determination is affirmative, the correction/display control section 64 deducts one from the value (e.g. an integer value of 1 to 4) representing the number of antennas determined based on the average value calculated by the second calculation section 63, thereby correcting the value. Subsequently, the correction/display control section 64 causes the display section (e.g. the upper LCD 22) to display the icon 50 in accordance with the corrected value.

As described above, the game apparatus 10 according to the exemplary embodiment sorts signals from the respective apparatuses by apparatus, and calculates the received signal strength (reception condition) of each apparatus. The game apparatus 10 calculates an integrated reception condition (comprehensive reception condition) of the apparatuses by using the received signal strengths of the respective apparatuses. Subsequently, the game apparatus 10 displays the icon 50 representing the comprehensive reception condition on the screen.

(Details of Display Process)

Figure 7:
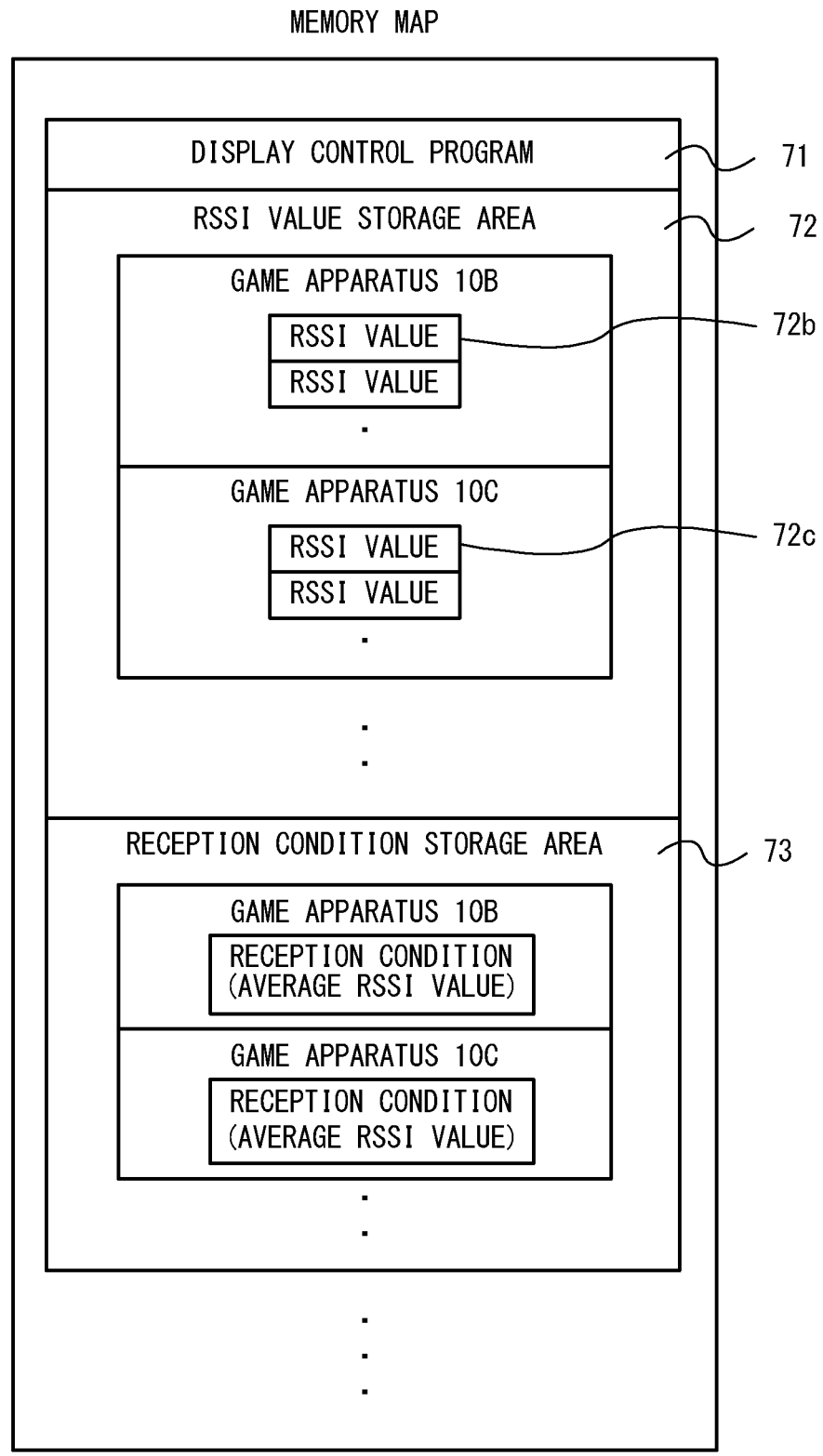
FIG. 7 is a diagram illustrating a non-limiting example of a memory map of a memory (e.g. a main memory 32) of the game apparatus 10.

Next, details of the display process performed by the game apparatuses 10 will be described. In the following, a process performed by the game apparatus 10A is described as an example. However, the same process is performed by each of the other game apparatuses 10. FIG. 7 is a diagram illustrating a memory map of a memory (e.g. the main memory 32) of the game apparatus 10.

As shown in FIG. 7, the memory of the game apparatus 10A includes an area for storing a display control program 71, an RSSI value storage area 72, and a reception condition storage area 73. The display control program 71 is a program for executing a display control process described later. The RSSI value storage area 72 stores RSSI values of received signals for each apparatus. In the RSSI value storage area 72, an area is allocated for each apparatus and the RSSI values are stored in corresponding areas allocated for the respective apparatuses. More specifically, arrays (72b and 72c) each having a given length for storing the RSSI values are provided for the respective apparatuses. For example, when the game apparatus 10A receives a signal from the game apparatus 10B, the RSSI value of the signal is stored in the array 72b provided for the game apparatus 10B in chronological order. The reception condition storage area 73 stores reception conditions of signals from the respective game apparatuses. For example, when the game apparatus 10A receives signals from the game apparatuses 10B and 10C, the reception condition storage area 73 stores a reception condition (average RSSI value) of the signals from the game apparatus 10B and a reception condition (average RSSI value) of signals from the game apparatus 10C.

FIG. 8 is a flow chart illustrating a flow of the display process executed by the game apparatus 10A. When the game apparatus 10A is powered on, the information processing section 31 (CPU 311) of the game apparatus 10A executes a start-up program stored in an ROM (not shown) to initialize each unit such as the main memory 32. Then, a program stored in the ROM is loaded to a memory (specifically, the main memory 32), and the CPU 311 of the information processing section 31 starts executing the program. The flow chart of FIG. 8 illustrates the process performed by the information processing section 31 after the above-described processing is completed. Process steps S1 to S8 shown in FIG. 8 are performed at predetermined time intervals.

Firstly, at step S1, the information processing section 31 receives signals (frames) from the respective game apparatuses. Specifically, the information processing section 31 accesses the wireless communication module 36 to receive frames transmitted from the respective game apparatuses. Further at step S1, when the information processing section 31 receives a signal from a certain game apparatus, the information processing section 31 sets a value T representing an elapsed time from the reception of the signal from the certain game apparatus to 0 and stores the value T in the memory. The memory stores the value T representing the elapsed time for each game apparatus. That is, the memory stores, a value TB representing an elapsed time from the reception of a signal from the game apparatus 10B, a value TC representing an elapsed time from the reception of a signal from the game apparatus 10C, and a value TD representing an elapsed time from the reception of a signal from the game apparatus 10D. For example, at step S1, when the information processing section 31 receives a signal from the game apparatus 10B and receives no signal from the game apparatus 10C and the game apparatus 10D, the information processing section 31 sets the value TB representing an elapsed time from the reception of the signal from the game apparatus 10B to 0. In this case, the information processing section 31 updates the value TC representing the elapsed time of the game apparatus 10C and the value TD representing the elapsed time of the game apparatus 10D without setting the values TC and TD to 0. Specifically, the information processing section 31 adds a time elapsed from a time when the process step S1 is performed in the immediately preceding cycle to a time when the process step S1 is performed in the current cycle to each of the values TC and TD stored in the memory, thereby updating the values TC and TD. Subsequently, the information processing section 31 performs the process step S2.

At step S2, the information processing section 31 obtains an RSSI value (received signal strength) of the signal received at step S1. Specifically, the information processing section 31 accesses the wireless communication module 36 and obtains the RSSI value of the signal received at step S1. Subsequently, the information processing section 31 performs the process step S3.

At step S3, the information processing section 31 sorts the RSSI values obtained at step S2 by game apparatus. For example, when the information processing section 31 receives a signal from the game apparatus 10B at step S1 and obtains an RSSI value of the signal from the game apparatus 10B at step S2, the information processing section 31 stores the RSSI value in the array 72b of the RSSI value storage area 72. Subsequently, the information processing section 31 performs the process step S4.

At step S4, the information processing section 31 calculates a reception condition of each apparatus. Specifically, the information processing section 31 obtains the RSSI values of the respective game apparatuses stored in the RSSI value storage area 72, and calculates an average value of the RSSI values of each apparatus. More specifically, the information processing section 31 obtains the RSSI values stored in respective elements of the array 72b, and calculates an average of the RSSI values. Then, the information processing section 31 stores the calculated average RSSI value in the reception condition storage area 73 as a reception condition of the signals from the game apparatus 10B. Further, the information processing section 31 obtains the RSSI values stored in respective elements of array 72c, and calculates an average of the RSSI values. Then, the information processing section 31 stores the calculated average RSSI value in the reception condition storage area 73 as a reception condition of the signals from the game apparatus 10C. As described above, the information processing section 31 calculates the reception condition of signals from each of the respective apparatuses. Next, the information processing section 31 performs the process step S5.

At step S5, the information processing section 31 calculates an average value of the reception conditions (the average RSSI values) of the respective apparatuses calculated at step S4. Specifically, the information processing section 31 obtains the average RSSI values of the respective apparatuses, excluding the apparatus from which no signal has been received for a predetermined time period, stored in the reception condition storage area 73, and calculates an average value of the obtained values. More specifically, the information processing section 31 obtains the average RSSI values of the respective apparatuses excluding the apparatus whose value T representing the elapsed time stored in the memory is greater than or equal to a predetermined value. For example, when the predetermined value is set to 10 seconds, that is, TB=0, TC=2, TD=10.5, the information processing section 31 calculates an average value using the values of the game apparatus 10B and the game apparatus 10C, excluding the game apparatus 10D. Specifically, the information processing section 31 calculates an average value (for example, −35 dBm) of the respective reception conditions by using the average RSSI value (for example, −30 dBm) of the game apparatus 10B and the average RSSI value (for example, −40 dBm) of the game apparatus 10C. The average value calculated as above represents an integrated reception condition of the respective apparatuses, and comprehensively represents the reception conditions of the signals from the respective apparatuses. Next, the information processing section 31 performs the process step S6.

At step S6, the information processing section 31 quantizes the average value calculated at step S5. Specifically, the information processing section 31 calculates, for example, an integer value (range of 1 to 4) based on the average value calculated at step S5. Next, the information processing section 31 performs the process step S7.

At step S7, the information processing section 31 executes a correction process. Specifically, the information processing section 31 compares each of the average RSSI values of the respective apparatuses calculated at step S4 with a predetermined threshold, and determines whether there is any apparatus whose average RSSI value is smaller than or equal to the predetermined threshold. When there is an apparatus whose RSSI value is smaller than or equal to the predetermined threshold, the information processing section 31 deducts one from the integer value calculated at step S6. Next, the information processing section 31 performs the process step S8.

At step S8, the information processing section 31 executes a display process. Specifically, the information processing section 31 generates an image of the icon 50 based on the value corrected at step S7 and causes the image to be displayed on the upper LCD 22. For example, when the value corrected at step S7 is four, the information processing section 31 generates an image of the icon 50 indicated by four antennas and causes the image to be displayed on the upper LCD 22. This is the end of the description of the flow chart shown in FIG. 8.

As described above, in the exemplary embodiment, average RSSI values (values representing reception conditions of signals from the respective apparatuses) of the respective apparatuses are calculated based on the signals received from the respective apparatuses. Then, an average value (a value representing a comprehensive reception condition) is further calculated by using the calculated average RSSI values. Subsequently, an image of the icon 50 is generated based on the calculated average value and displayed. For example, when the reception conditions of the signals from all of the apparatuses are good, four antennas are displayed. Such a displayed icon indicates the reception condition of the signals from the respective apparatuses integrated by the game apparatuses 10 and represents the reception conditions of the signals from the respective apparatuses comprehensively. As described above, by showing the reception conditions of the respective apparatuses comprehensively, users of the respective game apparatuses 10 are allowed to know the condition of radio waves of the entire network. For example, when a single game is played by exchanging data among the game apparatuses 10A to 10D, the data need to be shared among the apparatuses. In this case, each user can determine whether the current environment is suitable for a network game from a display of the condition of the radio waves of the entire network.

Further, in the exemplary embodiment, the calculated comprehensive reception condition (the average value calculated at step S5) is quantized to represent the condition in four steps and corrected. Accordingly, for example, when the average value calculated at step S5 is relatively great, even if there is an apparatus whose reception condition is excessively poor, the reception condition of the entire network can be represented comprehensively by taking into account the reception condition of such an apparatus.

(Modification)

In the exemplary embodiment, an average RSSI value is calculated as a reception condition of each apparatus. In another embodiment, an average error rate may be calculated for each apparatus. That is, in another embodiment, an average error rate of a certain apparatus may be calculated as a reception condition of the apparatus. For example, when the game apparatus 10 receives a plurality of frames from a certain apparatus, the game apparatus 10 can obtain the total number of frames transmitted from the apparatus and the number of frames having not been received by the game apparatus 10 based on the sequence numbers contained in the respective frames. Then, the game apparatus 10 deducts the number of frames having not been received from the total number, and thereby calculates an error rate of the apparatus.

In other words, the reception condition of signals from a certain apparatus is in accordance with a reception level of the signals from the apparatus. The reception condition may be, for example, an average RSSI value of the signals from the apparatus, or may be an average error rate of the signals from the apparatus.

Further, in the exemplary embodiment, reception conditions of the apparatuses are calculated, respectively, and values (average RSSI values) representing the calculated respective reception conditions are averaged, and thereby a comprehensive reception condition comprehensively representing the reception conditions of the apparatuses is calculated. In another embodiment, a comprehensive reception condition may be calculated based on a ratio of apparatuses whose calculated reception conditions satisfy a predetermined reference value to all of the calculated reception conditions. Then, the number of antennas to be displayed may be determined based on the calculated comprehensive reception condition. For example, when the game apparatus 10A communicates with four apparatuses, if there are three apparatuses whose average RSSI values are greater than or equal to a predetermined reference value, the ratio of apparatuses which satisfy the predetermined reference value is 3/4. Accordingly, in this case, the icon 50 represented by three antennas out of four antennas may be displayed on the screen.

Further, in another embodiment, the poorest reception condition of the calculated reception conditions of the respective apparatuses may be selected, and the selected reception condition may be calculated as the comprehensive reception condition. For example, when the game apparatus 10A communicates with the game apparatuses 10B to 10D, if a value (average RSSI value) representing a reception condition of signals from the game apparatus 10D is the poorest, the reception condition of the game apparatus 10D may be calculated as a comprehensive reception condition which is an integrated reception condition of all of the apparatuses.

Further, in another embodiment, any of the calculated reception conditions (average RSSI values) of the apparatuses is selected time-sequentially, and the selected reception condition may be calculated as the comprehensive reception condition. Specifically, for example, at a certain time point, the reception condition of the game apparatus 10B among the reception conditions of the game apparatuses 10B to 10D may be selected, and after a predetermined time period elapses, the reception condition of the game apparatus 10C may be selected. As described above, the apparatus to be selected may be switched over time. Then, the selected reception condition may be calculated as the comprehensive reception condition and the icon 50 may be displayed based on the calculated comprehensive reception condition.

Further, in the exemplary embodiment, when there is any apparatus whose average RSSI value is smaller than or equal to the predetermined threshold in the above correction process, one is deducted from the value quantized at step S6. In another embodiment, the correction process may be any process. For example, the number of apparatuses whose values representing the reception conditions are smaller than or equal to a predetermined threshold may be deducted from the quantize value as the correction process. Alternatively, for example, an unquantized value (an average value of the average RSSI values) may be corrected.

Further, in the exemplary embodiment, the comprehensive reception condition is calculated by simply calculating an average value of the calculated reception conditions (average RSSI values). In another embodiment, an average may be calculated after assigning weighting to the respective apparatuses. For example, the reception conditions are assigned weighting so that greater weighting is assigned to the reception condition of a specific apparatus among the plurality of apparatuses than those of the others of the plurality of apparatuses, and an average may be calculated. For example, the game apparatus 10B serving as the client communicates frequently with the game apparatus 10A serving as the master, while it is less frequent for the game apparatus 10B to directly communicate with the game apparatus 10C which is another client. In this case, in the game apparatus 10B, the reception conditions are assigned weighting so that greater weighting is assigned to the reception condition of the game apparatus 10A serving as the master than those of the others of the plurality of apparatuses, and an average of the respectively weighted reception conditions may be calculated.

Further, in another embodiment, when weighting is assigned to the respective apparatuses and an average is calculated, the weighting for the respective apparatuses may be calculated by using any method. For example, a variance of the RSSI values (the RSSI values of the respective signals stored in the RSSI value storage area 72) of each apparatus or the error rates stored for each apparatus may be calculated, and weighting may be assigned so as to be lighter as the variance of the apparatus is greater. Accordingly, weighting for the apparatus in an unstable communication status can be lighter, and thus an effect of the apparatus on a comprehensive reception condition to be calculated can be reduced.

Further, in another embodiment, when weighting is assigned to the respective apparatuses and an average is calculated, a value of weighting for each apparatus may be reduced in accordance with an elapsed time from the reception of a signal from each apparatus. For example, weighting assigned to the reception condition (average RSSI value) of the game apparatus 10B may be reduced in accordance with an elapsed time from the reception of a signal from the game apparatus 10B.

Further, in the above exemplary embodiment, the comprehensive reception condition is calculated by excluding the reception condition of the apparatus with respect to which a predetermined time period elapses from the reception of a signal from the apparatus. In another embodiment, predetermined data may be transmitted to the apparatus from which no signal has been received for a predetermined time period in order to receive a response from the apparatus. For example, when the predetermined time period elapses from when the game apparatus 10A receives a signal from the game apparatus 10B, the game apparatus 10A transmits a predetermined signal to the game apparatus 10B. When the game apparatus 10A receives a response for the signal from the game apparatus 10B, the game apparatus 10A calculates the comprehensive reception condition without excluding the game apparatus 10B. Meanwhile, when there is no response from the game apparatus 10B, the game apparatus 10A calculates the comprehensive reception condition based on the reception conditions of the other apparatuses except the game apparatus 10B. Further, in another embodiment, the game apparatus 10A may periodically transmit a predetermined signal and each of the other apparatuses may return a response for the signal to the game apparatus 10A.

In the above exemplary embodiment, with respect to the received signals (frames), the RSSI values of the signals are sorted by apparatus. In another embodiment, the RSSI values may be sorted not only by apparatus but also by signal type (type of frame). Here, the signal type may indicate, for example, a destination. For example, the signal types may be sorted based on whether they are broadcast data (data transmitted by broadcast) or unicast data (data transmitted by unicast). Alternatively, the signal types may be sorted based on their frame types (management frame, data frame, or control frame).

FIG. 9 is diagram illustrating a memory map of the game apparatus 10 in another embodiment. As shown in FIG. 9, the memory of the game apparatus 10A includes an RSSI value storage area 82 and RSSI values are stored for each apparatus and signal type. Specifically, array 821B for storing RSSI values of signals transmitted by broadcast from the game apparatus 10B, and array 822B for storing RSSI values of signals transmitted by unicast from the game apparatus 10B are provided. In addition, array 821C for storing RSSI values of signals transmitted by broadcast from the game apparatus 10C and array 822C for storing RSSI values of signals transmitted by unicast from the game apparatus 10C are provided. For example, when a signal (frame) received by the game apparatus 10A is a signal transmitted from the game apparatus 10B and is broadcast data, an RSSI value of the signal is stored in the array 821B. Accordingly, received signals are sorted by apparatus and signal type. Next, an average value of the RSSI values stored in each array is calculated and thereby the reception condition of each sorted group is calculated. Specifically, an average value (average RSSI value AV1) of the RSSI values stored in the array 821B, an average value (average RSSI value AV2) of the RSSI values stored in the array 822B, an average value (average RSSI value AV3) of the RSSI values stored in the array 821C, and an average value (average RSSI value AV4) of the RSSI values stored in the array 822C are calculated. Then, an average of the calculated respective average RSSI values is further calculated and thereby a comprehensive reception condition is calculated. At this time, the average RSSI values (AV1 to AV4) of the respective sorted groups may be weighted and an average of the weighted average RSSI values may be calculated. For example, weighting to the average RSSI values (AV2 and AV4) of unicast data may be assigned so as to be heavier than that of the average RSSI values (AV1 and AV3) of broadcast data.

Further, in the embodiment in which the RSSI values are sorted based on whether they are unicast data or broadcast data as described above, quantization is performed for each sorted group and an average value of respective quantized values may be calculated, thereby calculating a comprehensive reception condition. In this case, for example, a reference for quantizing unicast data may be different from a reference for quantizing broadcast data. For example, if an average RSSI value of broadcast data is quantized to "three," when the average RSSI value is within a predetermined range, an average RSSI value of unicast data may be quantized to "four," if the average RSSI value is within the predetermined range. Even in a relatively poor reception condition, the unicast data is retransmitted in case of failure of data reception/transmission. Thus, relatively stable communication can be maintained. Accordingly, even in a relatively poor reception condition, data are allowed to be handled assuming a good reception condition.

Further, in the above exemplary embodiment, an average value of the respective reception conditions (average RSSI values) is calculated as the comprehensive reception condition and quantization is performed based on the average value. In another embodiment, each of the average RSSI values may be quantized and an average of the respective quantized values may be calculated, and thereby a comprehensive reception condition may be calculated. Specifically, in another embodiment, an average RSSI value of each apparatus may be quantized and the comprehensive reception condition may be calculated by using the respective quantized values. In this case, a reference for quantizing the average RSSI value may be different for each apparatus.

Further, in the above exemplary embodiment, the icon 50 representing the comprehensive reception condition is displayed on the upper LCD 22. In another embodiment, a method of informing a user of a calculated comprehensive reception condition is not limited to the icon 50 represented by antennas as described above and may be any method. For example, letters indicating a comprehensive reception condition may be displayed on the upper LCD 22 or the lower LCD 12. Alternatively, the user may be informed of a comprehensive reception condition by another method such as sound, or the like.

Further, in the above exemplary embodiment, an example of a single network comprising the game apparatuses 10A to 10D is shown. In another embodiment, the game apparatus 10 may be connected to a plurality of networks and a comprehensive reception condition of each network may be calculated and displayed. Specifically, for example, the game apparatus 10P may belong to the network comprising the game apparatuses 10A to 10D and also belong to a network comprising the game apparatuses 10X to 10Z. In this case, the game apparatus 10P receives signals from the respective game apparatuses 10A to 10D, and also receives signals from the respective game apparatuses 10X to 10Z. On the game apparatus 10P, an icon representing a comprehensive reception condition of the network comprising the game apparatuses 10A to 10D and an icon representing a comprehensive reception condition of the network comprising the game apparatuses 10X to 10Z may be displayed.

Further, in another embodiment, a part of or all of the above described processing may be performed by a single or a plurality of dedicated circuits. Alternatively, the above described processing may be performed by a plurality of computers (the CPU 311, a processing section in the wireless communication module 36, and the like) included in the game apparatus 10. Further, different apparatuses may perform the respective processing, and thereby an information processing system that realizes the above described display method may be configured.

The above described display method may be applied not only to the game apparatus 10 but also to other information processors such as a PDA (Personal Digital Assistant), a highly-functional mobile phone having a wireless LAN function, a personal computer having a wireless communication function, an information processor that can communicate with other apparatuses by a unique communication method.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein an information processing program executed on a computer of an information processor having a wireless communication function, the information processing program comprising instructions that configure the computer to:
 calculate a reception condition of a signal transmitted from each of a plurality of apparatuses having a wireless communication function; and
 calculate a comprehensive reception condition representing the respective reception conditions of the signals from the plurality of apparatuses comprehensively by using the calculated reception condition of the signal transmitted from each of the plurality of apparatuses,
 wherein the comprehensive reception condition is calculated based on a ratio that is between (1) a number of the plurality of apparatuses that are greater than or equal to the predetermined reference value and (2) a number of the plurality of apparatuses that are less than the predetermined reference value or a total number of the plurality of apparatuses for which a reception condition has been calculated.

2. The non-transitory computer-readable storage medium having stored therein the information processing program according to claim 1, wherein values that respectively represent the calculated reception conditions are averaged, and thereby the comprehensive reception condition is calculated.

3. The non-transitory computer-readable storage medium having stored therein the information processing program according to claim 1, the information processing program further comprising instructions that configure the computer to correct the calculated comprehensive reception condition based on the respective reception conditions having been calculated.

4. The non-transitory computer-readable storage medium having stored therein the information processing program according to claim 3, the information processing program further comprising instructions that configure the computer to:
determine whether each of the values that represent the calculated respective reception conditions is smaller than or equal to a predetermined reference value,
wherein the comprehensive reception condition is corrected in accordance with a result of the determination.

5. The non-transitory computer-readable storage medium having stored therein the information processing program according to claim 4, wherein the comprehensive reception condition is corrected when there is any apparatus, among the plurality of apparatuses, with respect to which a result of the determination is affirmative.

6. The non-transitory computer-readable storage medium having stored therein the information processing program according to claim 1, the information processing program further comprising instructions that configure the computer to:
measure a time from reception of a signal from an apparatus to next reception of a signal from the apparatus,
wherein when the measured time is longer than or equal to a predetermined time period, the comprehensive reception condition is calculated, excluding the apparatus with respect to which the predetermined time period has elapsed.

7. The non-transitory computer-readable storage medium having stored therein the information processing program according to claim 1, wherein the comprehensive reception condition is calculated by using the lowest one of the values that represent the respective reception conditions.

8. The non-transitory computer-readable storage medium having stored therein the information processing program according to claim 1, wherein any of the respective reception conditions is selected time-sequentially, and the comprehensive reception condition is calculated by using the selected reception condition.

9. The non-transitory computer-readable storage medium having stored therein the information processing program according to claim 1, wherein each of the calculated respective reception conditions is assigned weighting and the weighted reception conditions are averaged, and thereby the comprehensive reception condition is calculated.

10. The non-transitory computer-readable storage medium having stored therein the information processing program according to claim 9, wherein the reception conditions are assigned weighting so that greater weighting is assigned to the reception condition of a specific apparatus among the plurality of apparatuses than those of the others of the plurality of apparatuses, and the values representing the weighted respective reception conditions are averaged, and thereby the comprehensive reception condition is calculated.

11. The non-transitory computer-readable storage medium having stored therein the information processing program according to claim 9, wherein
the respective reception conditions are calculated and a variance of values representing the reception conditions of signals transmitted from each of the respective apparatuses is calculated, and
each of the respective apparatuses is assigned weighting in accordance with the calculated variance for the apparatus and the values representing the weighted respective reception conditions are averaged, and thereby the comprehensive reception condition is calculated.

12. The non-transitory computer-readable storage medium having stored therein the information processing program according to claim 1, wherein the reception conditions of the signals transmitted from the plurality of apparatuses are sorted by apparatus and by signal type, and the reception condition is calculated for each sorted group.

13. The non-transitory computer-readable storage medium having stored therein the information processing program according to claim 12, wherein weighting is assigned in accordance with the signal type and the weighted values representing the respective reception conditions are averaged, and thereby the comprehensive reception condition is calculated.

14. The non-transitory computer-readable storage medium having stored therein the information processing program according to claim 12, wherein each of the values representing the respective reception conditions is quantized based on a different reference depending on the signal type, and the comprehensive reception condition is calculated by using the respective quantized values.

15. The non-transitory computer-readable storage medium having stored therein the information processing program according to claim 1, the information processing program further causing the computer to transmit a predetermined signal to at least one of the plurality of apparatuses and accept a response for the signal.

16. The non-transitory computer-readable storage medium having stored therein the information processing program according to claim 15, wherein the predetermined signal is transmitted to an apparatus, among the plurality of apparatuses, from which no signal has been received for a predetermined time period so that a response for the predetermined signal is received from the apparatus.

17. The non-transitory computer-readable storage medium having stored therein the information processing program according to claim 1, the program further causing the computer to execute notifying a user of information representing the comprehensive reception condition.

18. The non-transitory computer-readable storage medium of claim 1, wherein the information processing program comprises further instructions that configure the computer to output an image to a display device that represents the calculated ratio.

19. An information processor having a wireless communication function, the information processor comprising:
at least one processor that is coupled to a memory, the at least one processor configured to:
calculate a reception condition of a signal transmitted from each of a plurality of apparatuses having a wireless communication function; and
integrate the calculated respective reception conditions by calculating a comprehensive reception condition representing the respective reception conditions of the signals from the plurality of apparatuses comprehensively, wherein the comprehensive reception condition is calculated based on a ratio that is between (1) a number of the plurality of apparatuses that are greater than or equal to the predetermined reference value and (2) a number of the plurality of apparatuses that are less than the predetermined reference value or a total number of the plurality of apparatuses for which a reception condition has been calculated.

20. An information processing system which conducts wireless communication, the information processing system comprising:

a first calculation unit that configures a processing system, which includes at least one processor, to calculate a reception condition of a signal transmitted from each of a plurality of apparatuses having a wireless communication function; and a second calculation unit that configures the processing system to integrate the respective reception conditions calculated by the first calculation unit and calculate a comprehensive reception condition representing the respective reception conditions of the signals from the plurality of apparatuses comprehensively, wherein the comprehensive reception condition is calculated based on a ratio that is between (1) a number of the plurality of apparatuses that are greater than or equal to the predetermined reference value and (2) a number of the plurality of apparatuses that are less than the predetermined reference value or a total number of the plurality of apparatuses for which a reception condition has been calculated.

21. An information processing method comprising:

calculating a reception condition of a signal transmitted from each of a plurality of apparatuses having a wireless communication function; and integrating the calculated respective reception conditions and calculating a comprehensive reception condition that comprehensively represents the respective reception conditions of the signals from the plurality of apparatuses, wherein the comprehensive reception condition is calculated based on a ratio that is between (1) a number of the plurality of apparatuses that are greater than or equal to the predetermined reference value and (2) a number of the plurality of apparatuses that are less than the predetermined reference value or a total number of the plurality of apparatuses for which a reception condition has been calculated.

22. An information processing system comprising a plurality of apparatuses that each have a wireless transceiver, at least one of the plurality of apparatuses included in the information processing system including:

a first calculator which calculates a reception condition of a signal transmitted from each of the other apparatuses of the plurality of apparatuses;

a second calculator which integrates the respective reception conditions calculated by the first calculator and calculates a comprehensive reception condition representing the respective reception conditions of the signals from the other apparatuses of the plurality of apparatuses comprehensively; and a data receiver configured to receive data from the other apparatuses of the plurality of apparatuses, wherein the information processing system is capable of executing a single network game among the plurality of apparatuses by using data that is exchanged over a wireless network and via respective wireless transceiver(s) of the plurality of apparatuses, wherein the comprehensive reception condition represents, collectively, the condition of the wireless network that is being used for performance of the single network game by the plurality of apparatuses.

23. The information processing system according to claim 22, wherein the plurality of apparatuses comprise mobile apparatuses.

24. An information processing device capable of communicating with a plurality of apparatuses via wireless transmissions, the information processing device comprising:

a first calculator which calculates a reception condition of a wireless signal transmitted from each of the plurality of apparatuses;

a second calculator which integrates the respective reception conditions calculated by the first calculator and calculates a comprehensive reception condition representing the respective reception conditions of the wireless signals from the plurality of apparatuses comprehensively;

a data receiver configured to receive data from the plurality of apparatuses; and a processing arrangement configured to perform a network game in cooperation with the plurality of apparatus by execution of a network game process that uses game data received by the data receiver and transmitted from other ones of the plurality of apparatus, wherein the comprehensive reception condition represents, collectively, the condition of the wireless network that is being used for performance of the single network game by the plurality of apparatuses.

25. An information processing system which conducts wireless communication, the information processing system comprising:

a first calculator which calculates a reception condition of a signal transmitted from each of a plurality of apparatuses having a wireless communication function; and a second calculator which integrates the respective reception conditions calculated by the first calculator and calculates a comprehensive reception condition representing the respective reception conditions of the signals from the plurality of apparatuses comprehensively, wherein the second calculator calculates the comprehensive reception condition by assigning weighting to the reception conditions so that greater weighting is assigned to the reception condition of a specific apparatus among the plurality of apparatuses than those of other apparatuses, and averaging the values representing the weighted respective reception conditions.

26. An information processing system which conducts wireless communication, the information processing system comprising:

a first calculator which calculates reception conditions of signals transmitted from a plurality of apparatuses having a wireless communication function, where the signals from the plurality of apparatuses are of at least two different signal types; and a second calculator which integrates the respective reception conditions calculated by the first calculator and calculates a comprehensive reception condition representing the respective reception conditions of the signals from the plurality of apparatuses comprehensively, where signals of at least two of the plurality of apparatus are of the same signal type, wherein the first calculator sorts the signals transmitted from the plurality of apparatuses by signal type, and calculates the reception condition for each sorted group, and the second calculator calculates a comprehensive reception condition representing the reception conditions of signals of each signal type calculated by the first calculator.

27. An information processing system which conducts wireless communication, the information processing system comprising:

a processing arrangement including at least one processor, the processing arrangement being configured to provide:

a first calculation which calculates a reception condition of signals transmitted from each of a plurality of apparatuses having a wireless communication function; and a second calculation which integrates the respective reception conditions calculated by the first calculation and calculates a comprehensive reception condition representing the respective reception conditions of the signals from the plurality of apparatuses comprehensively; and a response reception device operatively coupled to the processing arrangement, the response reception device configured to transmit a predetermined signal to an apparatus, among the plurality of apparatuses, from which no signal has been received for a predetermined time period, and receive a response to the predetermined signal from the apparatus, wherein the processing arrangement calculates the reception condition of a signal received by the response reception device.

* * * * *